(12) United States Patent
Mackintosh et al.

(10) Patent No.: US 9,081,600 B2
(45) Date of Patent: Jul. 14, 2015

(54) VIRTUAL MACHINE VALIDATION

(75) Inventors: David N. Mackintosh, Manchester (GB); James W. Walker, Manchester (GB); James C. Whitson, Calderdale (GB)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 13/995,814

(22) PCT Filed: Dec. 19, 2011

(86) PCT No.: PCT/EP2011/073259
§ 371 (c)(1),
(2), (4) Date: Dec. 16, 2013

(87) PCT Pub. No.: WO2012/084837
PCT Pub. Date: Jun. 28, 2012

(65) Prior Publication Data
US 2014/0025961 A1    Jan. 23, 2014

(30) Foreign Application Priority Data

Dec. 21, 2010  (EP) .................................. 10196282

(51) Int. Cl.
*G06F 11/30*    (2006.01)
*G06F 17/50*    (2006.01)
(Continued)

(52) U.S. Cl.
CPC .......... *G06F 9/45533* (2013.01); *G06F 21/577* (2013.01)

(58) Field of Classification Search
CPC ........................... G06F 9/45533; G06F 21/577

USPC ................. 713/189, 190, 191, 192, 193, 194; 709/158; 703/13, 14

See application file for complete search history.

(56) References Cited

U.S. PATENT DOCUMENTS 5,237,668 A * 8/1993 Blandy et al. ..................... 711/2
7,219,315 B1 * 5/2007 Stoye et al. ................... 716/136
(Continued)

FOREIGN PATENT DOCUMENTS

WO    2009051471 A2    4/2009

OTHER PUBLICATIONS

International Application No. PCT/EP2011/073259, International Search Report, Feb. 28, 2012.

*Primary Examiner* — Abu Sholeman
(74) *Attorney, Agent, or Firm* — Russell Ng PLLC; Steven Bennett

(57) ABSTRACT

A system, method, and computer program product for providing validation of the compliance of a trusted host environment with a requirement of a virtual machine (VM). The system includes: a store component for cryptographically storing configuration data associated with the trusted host environment in at least one cryptographic data structure; a send component, responsive to the store component storing the configuration data, for sending the at least one cryptographic data structure to a control component; an analyze component, responsive to the control component receiving the at least one cryptographic data structure, for analyzing the at least one cryptographic data structure; a compare component, responsive to the analyze component determining the configuration data, for comparing the configuration data with the requirement; and a verify component, responsive to the compare component determining that the configuration data matches the requirement, for allowing verification of the VM.

19 Claims, 7 Drawing Sheets

(51) Int. Cl.
*G06F 9/455* (2006.01)
*G06F 21/57* (2013.01)

(56) References Cited

U.S. PATENT DOCUMENTS

| | | | |
|---|---|---|---|
| 8,055,912 B2* | 11/2011 | Bade et al. | 713/193 |
| 8,127,292 B1* | 2/2012 | Dobrovolskiy et al. | 718/1 |
| 8,165,864 B2* | 4/2012 | Mullen et al. | 703/14 |
| 8,265,919 B1* | 9/2012 | Queru et al. | 703/14 |
| 8,271,978 B2* | 9/2012 | Bennett et al. | 718/1 |
| 8,631,404 B2* | 1/2014 | Laor | 718/1 |
| 8,751,654 B2* | 6/2014 | Frank | 709/226 |
| 8,893,092 B1* | 11/2014 | Whitaker et al. | 717/131 |
| 2005/0071125 A1* | 3/2005 | Groz | 702/186 |
| 2005/0071126 A1* | 3/2005 | Groz | 702/186 |
| 2005/0154573 A1* | 7/2005 | Maly et al. | 703/21 |
| 2006/0206880 A1* | 9/2006 | Barraclough et al. | 717/140 |
| 2007/0061605 A1* | 3/2007 | Engler et al. | 713/500 |
| 2008/0072287 A1 | 3/2008 | Movva et al. | |
| 2008/0244569 A1 | 10/2008 | Challener et al. | |
| 2009/0169012 A1 | 7/2009 | Smith et al. | |
| 2009/0169017 A1* | 7/2009 | Smith et al. | 380/278 |
| 2010/0083251 A1* | 4/2010 | McCrory et al. | 718/1 |
| 2010/0107160 A1* | 4/2010 | Srinivasan | 718/1 |
| 2010/0250744 A1* | 9/2010 | Hadad et al. | 709/226 |
| 2011/0055829 A1* | 3/2011 | Dake | 718/1 |
| 2011/0296201 A1* | 12/2011 | Monclus et al. | 713/190 |
| 2011/0302400 A1* | 12/2011 | Maino et al. | 713/2 |
| 2012/0054486 A1* | 3/2012 | Lakkavalli et al. | 713/156 |
| 2012/0084549 A1* | 4/2012 | Mackintosh et al. | 713/2 |
| 2012/0131334 A1* | 5/2012 | Haikney et al. | 713/156 |
| 2012/0151209 A1* | 6/2012 | Visnyak et al. | 713/166 |
| 2012/0159454 A1* | 6/2012 | Barham et al. | 717/128 |
| 2012/0297057 A1* | 11/2012 | Ghosh et al. | 709/224 |
| 2013/0103817 A1* | 4/2013 | Koponen et al. | 709/223 |
| 2013/0110490 A1* | 5/2013 | Letz et al. | 703/21 |
| 2013/0117006 A1* | 5/2013 | Varghese et al. | 703/22 |
| 2014/0006817 A1* | 1/2014 | Bonen et al. | 713/320 |
| 2014/0025961 A1* | 1/2014 | Mackintosh et al. | 713/189 |
| 2014/0082621 A1* | 3/2014 | Fitzgerald et al. | 718/1 |
| 2014/0157268 A1* | 6/2014 | Gilbert et al. | 718/1 |
| 2014/0343915 A1* | 11/2014 | Song | 703/13 |
| 2015/0016469 A1* | 1/2015 | Ganichev et al. | 370/429 |
| 2015/0032436 A1* | 1/2015 | van de Kamp | 703/13 |

* cited by examiner

PRIOR ART    FIGURE 1

VIRTUAL MACHINE VALIDATION

TECHNICAL FIELD

The present invention relates to computer virtual machines. In particular, the present invention relates to an apparatus and method for validation of virtual machines.

BACKGROUND INFORMATION

A virtual machine (VM) is a software implementation of a physical computer. Computer programs designed to execute on the physical machine execute in a similar way when executed on a VM. A VM provides a complete system platform to support a full operating system (OS). A physical machine can be shared between users using different VMs, each running a different OS.

Modern processor architectures have enabled virtualization techniques that allow multiple operating systems and VMs to run on a single physical machine. These techniques use a hypervisor layer that runs directly on the physical hardware and mediates accesses to physical hardware by providing a virtual hardware layer to the operating systems running in each virtual machine. The hypervisor can operate on the physical machine in conjunction with a 'native VM'. Alternatively, the hypervisor can operate within an operating system running on the physical machine, in conjunction with a 'hosted VM' operating at a higher software level.

Examples of VM technology are:
- Linux® Kernel-Based Virtual Machine (KVM), which allows one or more Linux or Microsoft® Windows® virtual machines to be run on top of an underlying Linux that runs KVM.
- Xen, which allows a guest (virtualized) Linux to be run on top of Linux.
- Parallels, which allows Linux and Windows on top of Mac OS X.
- VMWare which allows Linux and Windows systems on top of Mac OS X, Windows and Linux systems.

(Linux is a registered trademark of Linus Torvalds in the United States, other countries, or both. Microsoft and Windows are trademarks of Microsoft Corporation in the United States, other countries, or both.)

A Trusted Platform Module (TPM) is a system compliant with a security specification defined by the Trusted Computing Group (TCG). It is typically implemented as a component of a computer system that provides cryptographic keys that protect information. A TPM can also provide remote attestation that allow changes to a computer system to be detected by authorised parties. TPM can either be implemented in hardware, in software, or as a combination.

A virtual TPM (vTPM) provides TPM services to a VM running on a hypervisor. A vTPM is defined as a TPM implemented in software—it can provide TPM services to anything, not just VMs. The VM and its associated vTPM are securely maintained throughout the life of the VM, even if the VM migrates from one physical machine to another. The vTPM must also maintain a secure association to its related trusted computing base.

The vTPM can be hosted in user space in the VM, in a secure coprocessor, or hosted in a separate VM of its own.

A VM deployed into a data-centre will have many requirements about the environment in which it runs. These could range from the type of hardware or some low level system configuration that is out of sight and control of the VM. Such requirements may be specified in a Service Level Agreement (SLA) and may form part of industry regulations. As a VM migrates from system to system it is easy for one of these requirements to be broken. Also as administrators make changes to their systems they may be unaware of the VM's requirements, again breaking them.

For a system owner who has deployed a VM in a remote data-centre there will be great difficulty in validating that these requirements are being met. Even a system owner who can see the data-centre systems still may find it inconvenient to validate that their requirements are being met.

Although the use of VMs provides cost benefits to platform owners, VMs need to be protected from malicious attacks. One approach is to use a root of trust, such as a hardware based Trusted Platform Module (TPM), which assesses the integrity of all software running on a platform, including the operating system, hypervisor, and applications running within VMs. A TPM allows remote attestation by digitally signing cryptographic hashes of software components. In this context: "attestation" means to provide evidence of the exact software/hardware components that were booted; "verification" means to decide whether or not these values are good; "validation" means the effect of attestation, verification, or a combination of them.

TPMs and Trusted Computing do not protect against situations which may break a service level agreement (SLA).

Therefore, there is a need in the art to address the shortcomings of known trusted computing systems.

SUMMARY

Viewed from a first aspect, the present invention provides a system for providing validation of the compliance of a trusted host environment with a requirement of a virtual machine (VM). The system includes: a store component for cryptographically storing configuration data associated with the trusted host environment in at least one cryptographic data structure; a send component, responsive to the store component storing the configuration data, for sending the at least one cryptographic data structure to a control component; an analyze component, responsive to the control component receiving the at least one cryptographic data structure, for analyzing the at least one cryptographic data structure; a compare component, responsive to the analyze component determining the configuration data, for comparing the configuration data with the requirement; and a verify component, responsive to the compare component determining that the configuration data matches the requirement, for allowing verification of the VM in the trusted host environment.

Preferably, the present invention provides a system, wherein the verify component, responsive to the compare component determining that the configuration data does not match the requirement, denies verification of the VM in the trusted host environment.

Preferably, the present invention provides a system wherein the store component is a hypervisor; wherein the at least one cryptographic data structure is at least one platform configuration register (PCR); wherein the at least one cryptographic data structure is associated with a further trusted host environment of the VM; wherein the trusted host environment comprises a Trusted Platform Module; and wherein the system further comprises a first server comprising the trusted host environment, and a second server comprising the control component.

Viewed from a second aspect, the present invention provides a method for providing verification of the compliance of a trusted host environment with a requirement of a virtual machine (VM), the method comprising: cryptographically storing configuration data associated with the trusted host environment in at least one cryptographic data structure; in response to storing the configuration data, sending the at least one cryptographic data structure to a control component; in response to receiving the at least one cryptographic data structure, analyzing the at least one cryptographic data structure; in response to determining the configuration data, comparing the configuration data with the requirement; and in response to determining that the configuration data matches the requirement, allowing verification of the VM in the trusted host environment.

Preferably, the present invention provides a method, wherein the method further comprises, in response to the step of determining that the configuration data does not match the requirement, denying verification of the VM in the trusted host environment.

Preferably, the present invention provides a method: wherein the step of cryptographically storing configuration data associated with the trusted host environment in at least one cryptographic data structure comprises cryptographically storing configuration data associated with the trusted host environment in at least one platform configuration register (PCR); wherein the method further comprises associating the at least one cryptographic data structure with a further trusted host environment of the VM; wherein the trusted host environment comprises a Trusted Platform Module; and, wherein the trusted host environment is a first server and the control component is a second server.

Viewed from a further aspect, the present invention provides a computer program product for providing validation of the compliance of a trusted host environment with a requirement of a virtual machine (VM), the computer program product comprising: a computer readable storage device storing instructions for execution by a computer system to cause the computer system to perform the steps of the invention.

Advantageously, the present invention provides a method that will allow the system owner to use remote verification to verify that their requirements are met. The present invention extends the use of the virtual Trusted Platform Module (vTPM) to report more than just the VM software configuration.

Advantageously, existing methods of remote verification can still be made using a Trusted Boot of the system, and can therefore be confident that they are running a known and trusted software configuration.

Advantageously, the VM owner can also check the environmental requirements of the system by reserving a platform configuration register (PCR) for use by the system hypervisor. The hypervisor sits below the virtual machines and has direct control over the hardware of the system. The hypervisor is in the best position to report on the system status and configuration for the VM environmental requirements. With the vTPM device being virtual and loaded from the hypervisor the solution is to allow the hypervisor to set a PCR or a plurality of PCRs to reflect the environment. When the VM is running and verification is performed the VM owner can see the state of the environment through PCRs and thus check their requirements are met. Advantageously, an owner of a VM Owner can check system settings when they only have access to the VM running on the system.

Advantageously, vTPMs and the hypervisor communicate with each other. PCR(s) are assigned for storing measurements of items out of sight from the VM. Advantageously, components below the VM cooperate to measure interesting items and propagate the measurements into the vTPM's PCR(s). Remote verification can also validate the assigned PCR(s) against a policy. When the VM is attested it not only reports on the state of the booted software, but also some information about the server the VM runs on.

Advantageously, known tools can be extended to allow the attestation feature to contain validation functionality of, for example, PCR8 to ensure that the systems are compliant against environmental requirements such as a "dev" user of a Flexible Service Processor (FSP). This gives ease of management over many VMs with such requirements. The FSP is a small controlling computer system that resides on a IBM® POWER6® system. (IBM and POWER6 are trademarks of International Business Machines Corporation in the United States, other countries, or both.)

With the current state of the art a VM has no way of checking the FSP for such configuration. The present invention addresses this because the FSP, the hypervisor and vTPM are all connected and can measure each other then report the measurements via the assigned PCR.

Advantageously, reporting of such data via PCRs and attestation is of value to customers, with a service level agreement (SLA) that requires their VMs to run on particular types of central processing units (CPUs). Attestation and subsequent verification will help prove that the SLA is being met especially if a VM is migrated to another physical system at any time.

Advantageously, the VM owner can check system settings when they only have access to the VM running on the system. The PCRs assigned for storing measurements of items are out of sight from the VM. Components below the VM cooperate to measure interesting items and propagate the measurement into the vTPM's PCRs, for example by the vTPM and hypervisor communicating with each other. Attestation and verification can validate the assigned PCRs against a policy.

BRIEF DESCRIPTION OF THE DRAWINGS

The present invention will now be described, by way of example only, with reference to preferred embodiments, as illustrated in the following figures.

DETAILED DESCRIPTION

Figure 1:
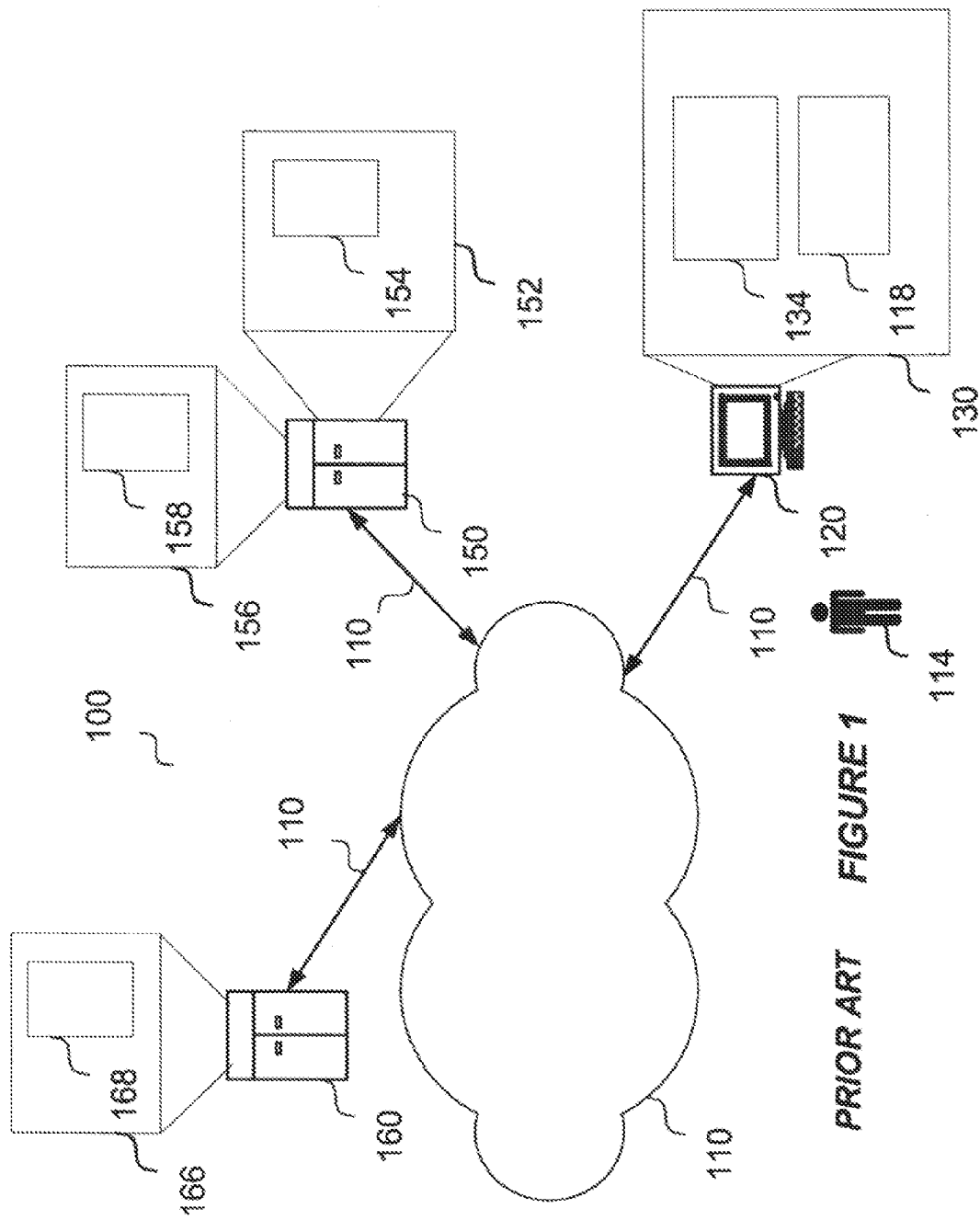
FIG. 1 is a block diagram depicting a data processing system, in accordance with the prior art, and in which a preferred embodiment of the present invention may be implemented.

FIG. 1 is a block diagram depicting a data processing system 100, in accordance with the prior art, and in which a preferred embodiment of the present invention may be implemented. The data processing system comprises workstation 120, and servers 150, 160. The workstation 120, and the servers 150, 160 are connectable through a network 110.

Server 150 comprises two virtual machines (VMs) 152, 156 that are running different operating systems. Applications 154, 158 are operable on the VMs 152, 156, respectively. Server 160 comprises one VM 166. Applications 168 is operable on the VM 166. The user 114 accesses the applications 154, 158, 166 by interacting with application client programs 134 on the workstation 120. An administrator 114 controls the data processing system 100 through a control program 118 operable on the workstation 120.

Figure 2:
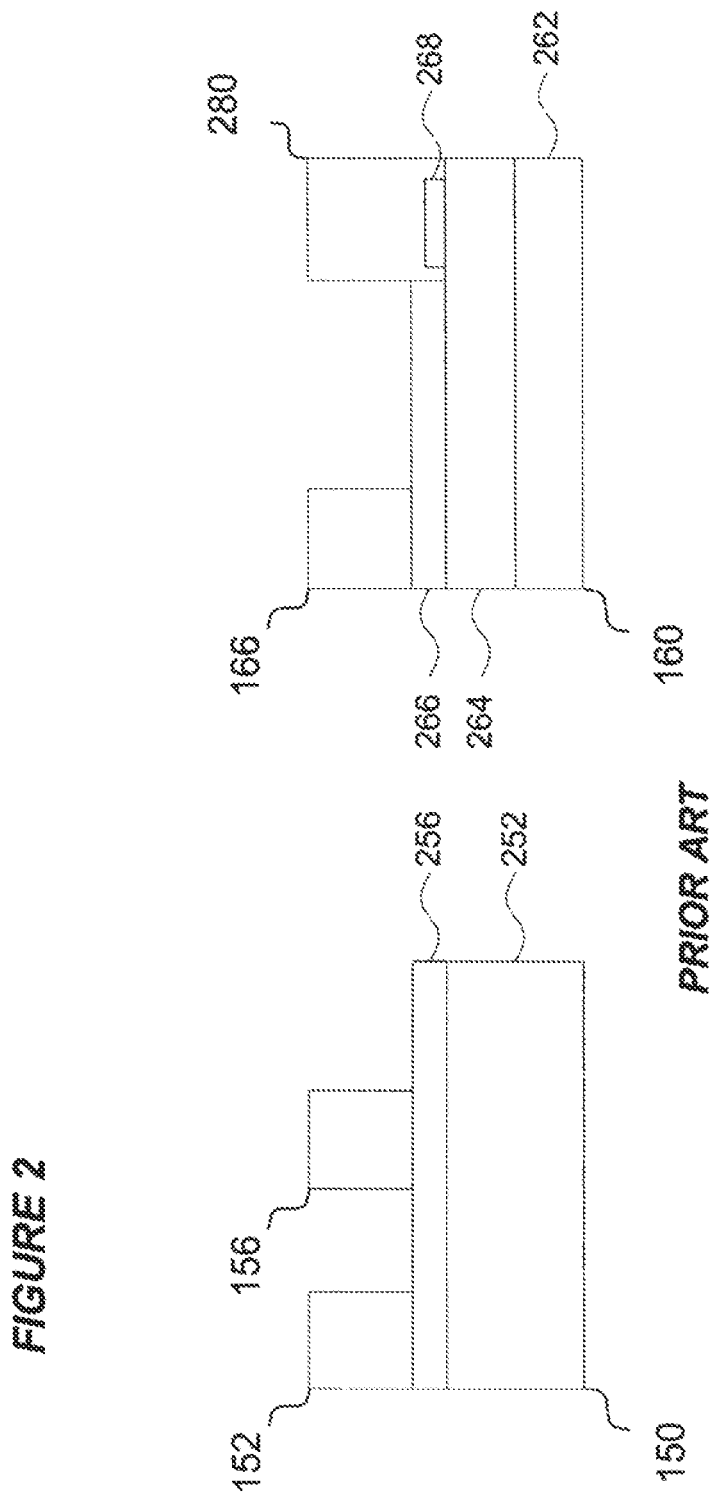
FIG. 2 is a block diagram depicting two physical servers, in accordance with the prior art, and in which a preferred embodiment of the present invention may be implemented.

FIG. 2 is a block diagram depicting the two servers 150, 160, in accordance with the prior art, and in which a preferred embodiment of the present invention may be implemented. A hypervisor 256 is operable on the physical hardware 252 of physical server 150 and allows native VMs 152, 156 to run on top of it. The VMs 152, 156 are each isolated from each other and are operable as if they are running on an entire real system. The hypervisor 256 emulates hardware for each VM 152, 156 such that when the VM 152, 156 wishes to access its virtualised hardware devices (for example, an Ethernet card, or Small Computer System Interface (SCSI) controller), the hypervisor 256 intercepts these instructions and converts them to accesses to physical hardware 250.

An operating system (OS) 264 is operable on the physical hardware 262 of physical server 260. A hypervisor 266 is operable on the OS 264. Guest VM 166 is operable on the hypervisor 266. VM 280 is operable on the OS 264.

A System Translator (ST) 268 is a software component that allows a whole system (OS 264 and applications 154, 158) that was designed for one Instruction Set Architecture (ISA) (for example, Sun SPARC) to run on a different ISA system (for example IBM® POWER6®). (IBM and POWER6 are trademarks of International Business Machines Corporation in the United States, other countries, or both.) The ST 268 sits as a layer between the VM 280 and the physical hardware 262.

As depicted in FIG. 2, the ST 268 is operable within an operating system (not shown) in the guest VM 280. In this case, the OS 264 and a user space program are started that provide the system translation functionality. The ST 268 provides a similar service for a single VM 280, that a hypervisor 256, 266 provides for multiple VMs 152, 156, 166 running on a physical machine 150, 160. The ST 268 emulates hardware in the same way as a hypervisor 256, 266, but for hardware for a different architecture. In addition, the ST 268 translates instructions that the VM 280 wishes to execute. System translators, typically, use dynamic binary translation to convert machine instructions from one ISA to another. Hardware emulation is also used so that the entire machine is emulated and entire system images can run unaltered.

In an alternative embodiment, the ST 268 is operable as part of the hypervisor 266. In an alternative embodiment the ST 268 is operable directly on the hypervisor 266. In this embodiment, the ST 268 acts like an OS that runs in a VM 152, 156, 166, 280. In alternative embodiments: the ST 268 is operable within the native OS 264; as a layer above the native OS 264; or between a VM 152, 156, 166, 280 and the physical hardware 252, 262.

Functions of a ST 268 in normal operations comprise translating instructions and emulating hardware. Translating instructions uses dynamic binary translation to execute the instructions required by the VM 280 on a different physical architecture. Emulation of hardware provides a mechanism by which hardware that the translated OS expects to be present is emulated. This includes, for example, network cards, memory controllers, interrupt controllers, read only memories (ROMs), and random access memory (RAM).

Figure 3:
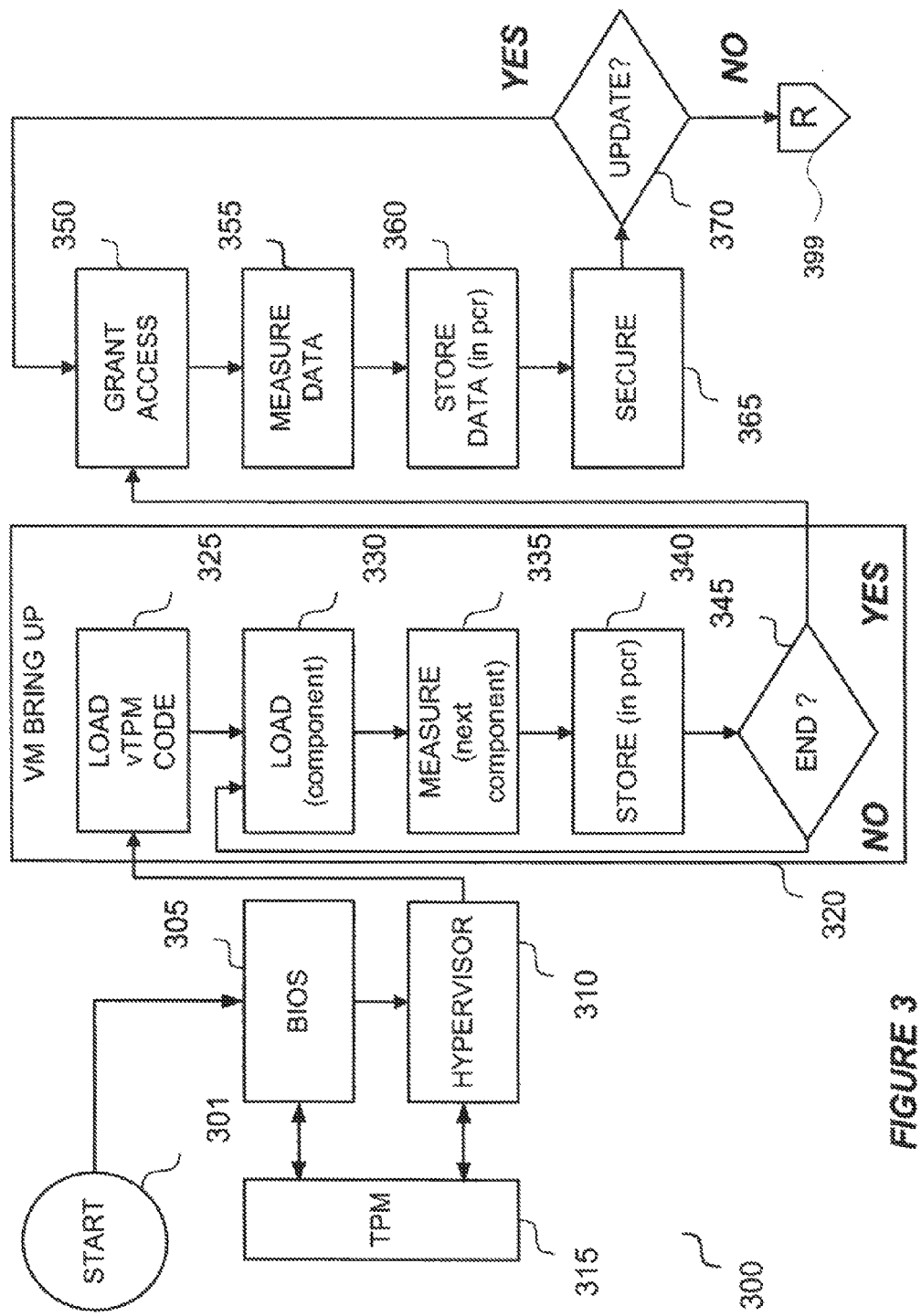
FIG. 3 is a high-level exemplary schematic flow diagram depicting operation method steps for providing trusted data of a virtual machine (VM), in accordance with a preferred embodiment of the present invention.
Figure 4:
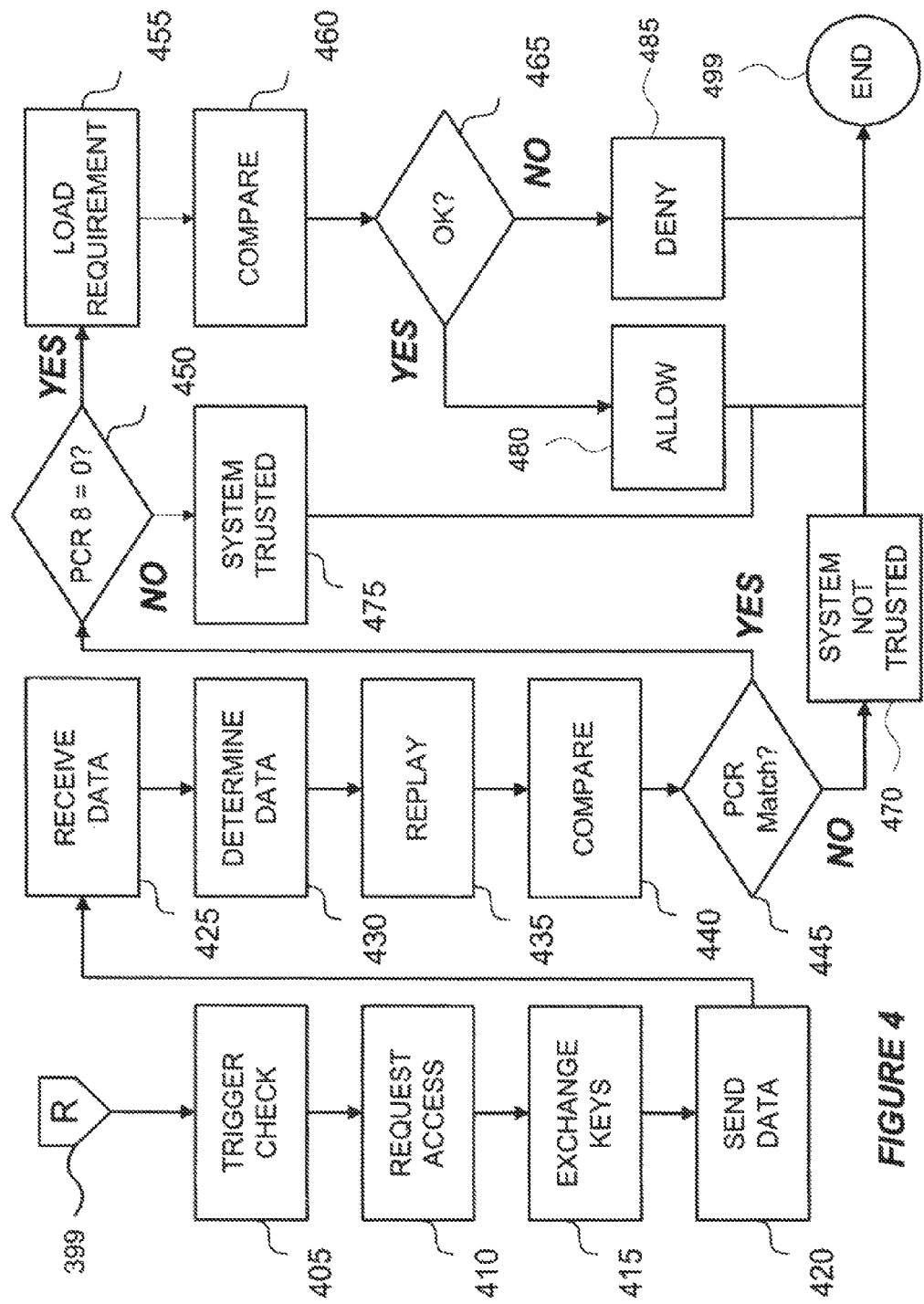
FIG. 4 is a high-level exemplary schematic flow diagram depicting operation method steps for providing validation of the compliance of a trusted host environment with a requirement of the VM, in accordance with a preferred embodiment of the present invention.
Figure 5:
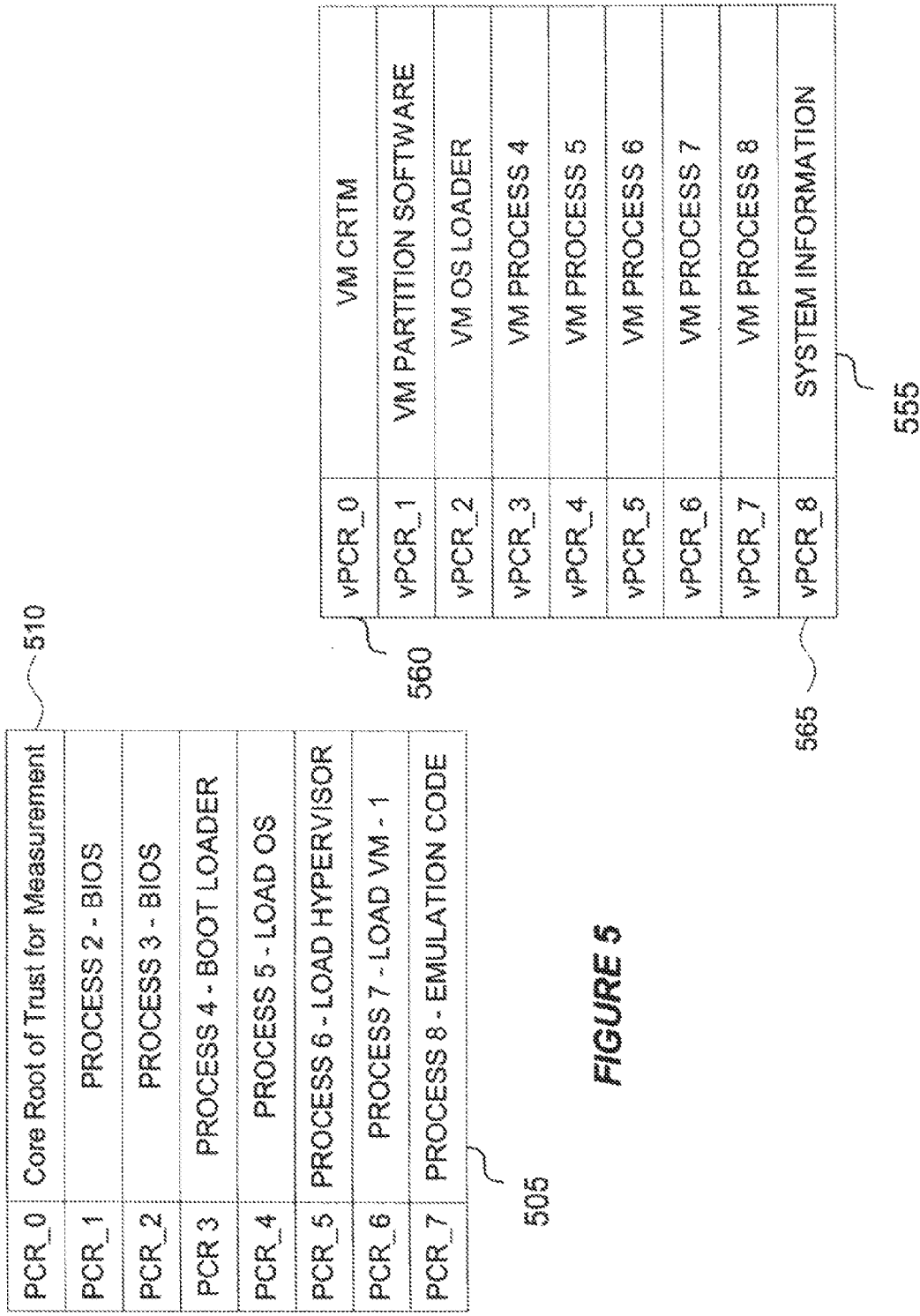
FIG. 5 is a block diagram depicting Platform Configuration Registers (PCRs), in accordance with a preferred embodiment of the present invention.
Figure 6:
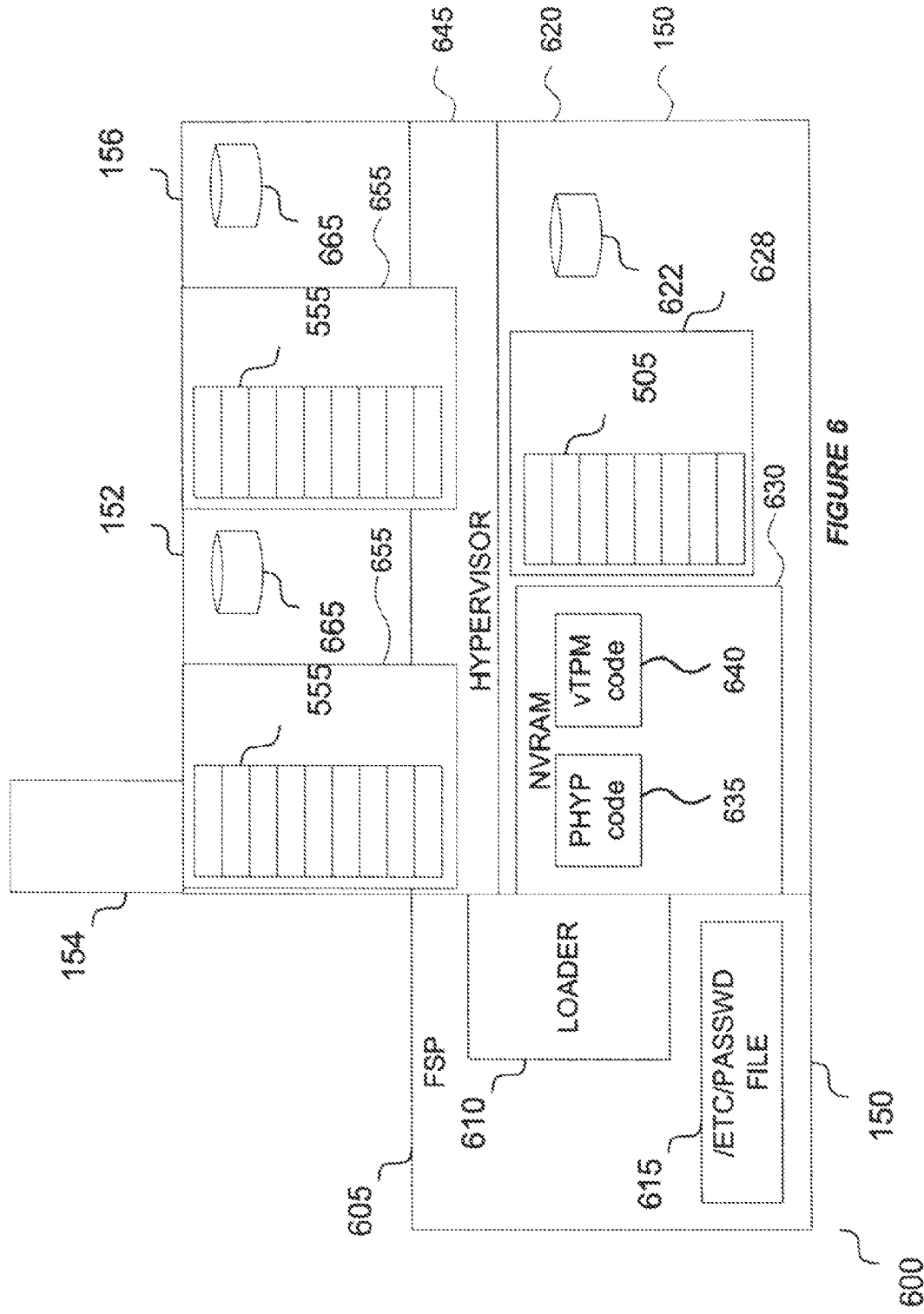
FIG. 6 is a block diagram depicting the server, in accordance with a preferred embodiment of the present invention.
Figure 7:
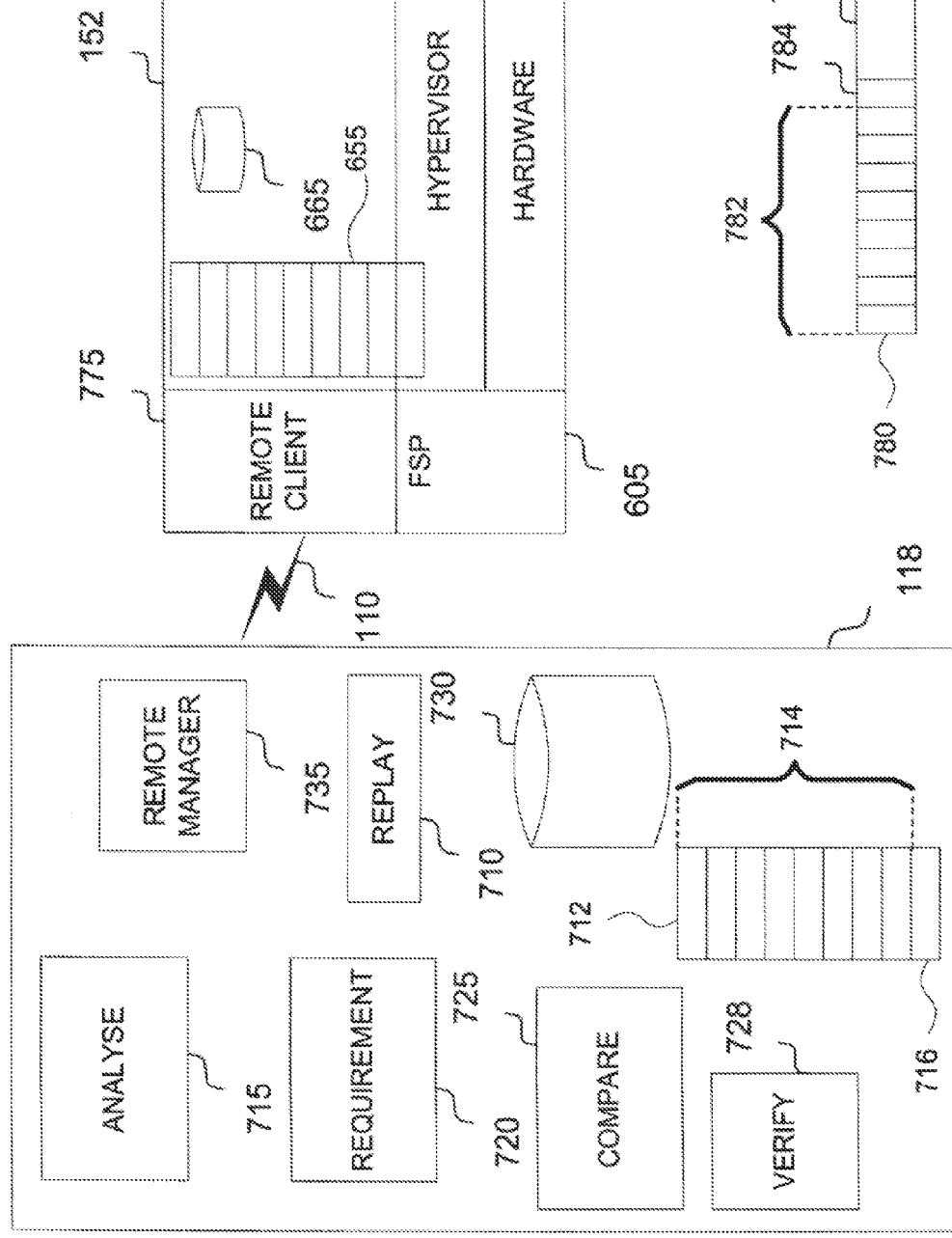
FIG. 7 is a block diagram depicting a control program operable on the workstation in communication with the server, in accordance with a preferred embodiment of the present invention.

FIG. 3, which should be read in conjunction with FIGS. 4, 5, 6, and 7, is a high-level exemplary schematic flow diagram 300 depicting operation method steps for providing trusted data of a virtual machine (VM), in accordance with a preferred embodiment of the present invention. FIG. 4 is a high-level exemplary schematic flow diagram 400 depicting operation method steps for providing validation of the compliance of a trusted host environment with a requirement 720 of the VM, in accordance with a preferred embodiment of the present invention. FIG. 5 is a block diagram depicting Platform Configuration Registers (PCRs) 505, 555, in accordance with a preferred embodiment of the present invention. FIG. 6 is a block diagram 600 depicting the server 150, in accordance with a preferred embodiment of the present invention. FIG. 7 is a block diagram depicting a control program 118 operable on the workstation 120 in communication with the server 150, in accordance with a preferred embodiment of the present invention.

The present invention will be described using IBM POWER6 virtualisation architecture as an example only. The skilled person will appreciate that the present invention is equally applicable to other virtualisation architectures.

As an example to illustrate the present invention, remote attestation is interested in the status of whether a "sample" user account has been enabled on the underlying server. The skilled person will appreciate that the remote attestation could be interested in any number of information items concerning the underlying server. For example, other configuration flags such as debug mode, dumping modes, fault flags, firmware versions, hardware settings and many more can be reported via the mechanism described by the present invention.

The method starts at step 301, with power being applied to the server 150. At step 305, the basic input/output system (BIOS) brings up the hardware 620 of the server 150. The server 150 also comprises non-volatile storage (NVRAM) 630, in which code 635 and configuration 635 for the server hypervisor (also known as PHYP) 645 resides. A small controlling computer system resides on the POWER system called the Flexible Service Processor (FSP) 605. The FSP 605 controls the NVRAM 630, and is responsible for loading and updating the hypervisor 645 using loader code 610. Control and updates over the hypervisor 645 are considered restricted (only digitally signed updates can be applied) therefore the hypervisor 645 is considered trusted forming part of the core-root of trust (CRT). At step 310, the hypervisor code 635 is loaded, and the hypervisor 645 started for the server 150.

As the server 150 is brought up, a trusted platform module (TPM) process 315 is started, recording events in a host database 622, and storing cryptographically measured results in a TPM 628 in a set of PCRs 505. The TPM 628 is stored in a secure location on the server hardware 620. Trusted Boot is a procedure for booting and establishing a chain of trust in a computing system. Using the TPM process 315, components of the boot can be cryptographically measured and results cryptographically stored in PCRs 505 of the TPM 628. PCRs 505 are initialised at power up, and modified using an extension function. Each boot component measures the next boot component by calculating hash values of byte arrays representing the next boot component. The resultant value is cryptographically concatenated with the existing PCRs 505. Once the bring-up is complete, the final set of PCRs 505 represents the chain of trust. Once the system is running, the chain of trust can be extracted for inspection by a remote system using a remote attestation procedure e.g. DAA (Direct Anonymous Attestation) in the control program 118. The values of the PCRs 505 are used to decide whether a server can be trusted. Processes exist that pass the PCR extension process through the whole boot process, including, for example, BIOS, boot loader (for example, hypervisor load), any native operating system (OS) 264 start up, and any native application launch. FIG. 5 depicts an exemplary set of PCRs 505 showing the location of different hash values for bring-up processes. For example, PCR__0 comprises the hash value of the Core Root of Trust for Measurement (CRTM) in field 510. The CRTM represents the BIOS boot block code, and is considered permanently trustworthy.

At step 320, the hypervisor brings-up one of the VMs 152. The NVRAM 630 also comprises virtual Trusted Platform Module (vTPM) code 640. Each VM 152, 156 runs above the hypervisor 645 with an associated vTPM 555 allowing the VM 152, 156 to perform a Trusted Boot and subsequent remote attestation. At step 325, the vTPM code 640 is loaded. The VM 152 records bring-up events in a VM database 665, and also builds up a set of virtual PCRs (vPCRs) 555 in its vTPM 655 during its bring-up. Similarly to the bring-up of the initial system in steps 305, 310 and 315, a software component is loaded (at step 330), the following component is cryptographically measured (at step 335), and the result is stored in the vPCR 555 (at step 340). At step 345, a decision is made on whether the VM 152 has been completely brought up. If there are further components to load, control is returned to step 330. The further components could comprise applications 154, 158, 168. In a preferred embodiment responsibility for updating the vPCRs 555 is passed to the hypervisor 645. In an alternative embodiment, the VM 152 updates its vPCRs 555. In the example, vPCR__0 to vPCR__7 are updated, because there are eight stages of VM 152 bring-up.

A vTPM can be stored in a variety of locations. In a preferred embodiment, each VM 152, 156 controls its own associated vTPM 655. In an alternative embodiment, all vTPMs 655 are controlled by a managing VM, with access being routed through to the appropriate vTPM 655 from the corresponding VM 152, 156. The skilled person will appreciate that a number of different architects can be provided to control vTPMs 655.

If there are no further components to load, the bring-up of the VM 152, control passes to step 350. At step 350, the hypervisor 645 is granted access to the vPCR__8 565. vPCR__8 565 is not used by steps 320. At step 355, the FSP 605 records the Secure Hash Algorithm-1 (SHA-1) hash function of the "/etc/passwd" file of the server 150, which in default configuration has a known measurement. The skilled person will appreciate that other cryptographic algorithms could be used. The FSP 605 and the hypervisor 645 collude to pass this measurement to extend PCR__8 565 with the hash, at step 360. The PCR 565 identified to save the configuration data associated with the trusted host environment is reserved solely for this use. At step 365, access to the vTPM 655 is secured to ensure no inadvertent access, which would jeopardise the trustworthiness of it.

In an alternative embodiment, the hypervisor 645 records system information in more than one vPCR location not used by the VM bring-up steps 320.

At step 370, if there are any updates to the "/etc/passwd" file of the server 150, control is passed back to step 350. For example, the administrator 114 makes changes to the FSP 605, enabling the "dev" user account. The SHA-1 hash of the "/etc/passwd" file changes to be another known value. In this embodiment the hypervisor 645 instructs the vTPM 655 to extend PCR__8 565 again with the new measurement and instructs the VM 152 to record the update in the virtual database 665, giving PCR__8 565 a new and unique yet known and predictable value reflecting the state of the FSP "/etc/passwd" file.

At step 399, the method passes to the validation method of FIG. 4.

At step 405, a request is received by the control program 118 to perform a remote attestation to the VM 152. At step 410, the control program 118 requests access to the VM 152. At step 415, a cryptographic key exchange occurs between a remote manager 735 of the control program 118, and a remote client 755 of the VM 152, to ensure that the control program 118 is authorised to access the VM 152.

At step 420, the VM 152 sends a message 780 to the control program 118. The message 780 comprises first values 782 corresponding to values in PCR__0 to PCR__7, a second value 784 for PCR__8 565, details 786 of first events corresponding to the bring-up of the VM 152, and details 788 of second event(s) 788 corresponding to the recording of the "/etc/passwd" file value. At step 425, the control program 118 receives the message 780. At step 430, an analyse component 715 analyses the message 780 to determine the first values 782, the second values 784, the first events details 786, and the second events details 788. First and second values 782, 784 and first and second events details 786, 788 are stored in a control program database 730. At step 435, a replay component 710 simulates the first events using the first events details 786 to establish a set of PCR values 714 corresponding to the simulated first events. The replay component 710 also simulates the second events using the second events details 786 to establish a PCR value 716 corresponding to the simulated second event.

PCR values are unique to the set of events that were run to produce the values. Simulation of the same events will always result in the same set of PCR results. Simulation of different events will always result in a different set of PCR results. Therefore, a comparison of PCR results against two sets of events can be used to decide on whether the events are the same. If the events are not the same, then this could be indicative that one set has been tampered with, and, therefore, that the system cannot be trusted.

At step 440, a compare component 725 compares the first values 782, corresponding to PCR__0 to PCR__7 of PCR 555 received from the VM 152, with the set of PCR values 714. The compare component 725 also compares the second values 784, corresponding to PCR__8 565 of PCR 555 received from the VM 152, with the set of PCR values 716. At step 445, if the set of PCR values 712 do not match the expected first values 782, the system cannot be trusted, and the method moves to step 470. At step 470, the administrator 114 takes any action associated with a non-trusted system, for example, disabling the VM 152.

Alternatively, if the set of PCR values 714 does match the expected first values 782, the system can be conditionally trusted, and the method moves to step 450. At step 450, the second value 784 is measured. If the second value 784 is zero, it indicates that no system value has been set and that the system is trusted, with control being passed to step 475. At step 475, the administrator 114 takes any action associated with a trusted system, for example, recording the result for audit purposes. If the second value 784 is non-zero, it is indicative that a system value has been set, with control being passed to step 455.

At step 455, the control program 118 loads the requirement 720 and calculates a corresponding cryptographic value. At step 460, the compare component 725 compares the cryptographic value with the second value 784. Matching this cryptographic value and the second value 784 indicates that the system 150 meets the requirement 720. At step 465, if the cryptographic value matches the second value 784, the requirement 720 is met, with control passed to step 480. At step 480, a verify component 728 is invoked knowing the satisfactory status of the VM 152, and allows verification by performing an action associated with satisfactory status of the VM 152 in the trusted host environment in meeting the SLA requirements, for example, but not limited to, logging the result in an audit log. However, if the cryptographic value does not match the second value 784, the requirement 720 is not met, with control passed to step 485. At step 485, the verify component 728 is invoked knowing the unsatisfactory status of the VM 152, and denies verification by performing an action associated with failure to meet the SLA requirements. For example, at step 485, if the administrator 114 makes changes to the FSP 605, enabling the "dev" user account, but there is a requirement 720 that the VM 152 must run with "dev" disabled then action can be taken as a result of the remote attestation, for example, disabling the "dev" user account. This happens whilst the VM 152 is running so that any attestations performed show that the FSP "dev" user has been enabled without rebooting the VM 152.

The method ends at step 499.

In alternative embodiments, more environmental and configuration items are measured and reported via vPCRs 555 to remote attestation.

In an alternative embodiment, the hypervisor 645 reports on more than user accounts within the lower system. One useful item that could be measured is the actual configuration of the hardware (for example, Central Processing Unit (CPU) identification number (ID), type, speed, memory amount, hardware serial numbers).

In an alternative embodiment, the hypervisor 645 reports on versions or patch levels, which could for example prove that some security fix had been applied.

In an alternative embodiment of the present invention, the method is used for system architectures as described in FIG. 2: vTPMs are maintained and updated by System Translators instead of, or in conjunction with a hypervisor.

In a preferred embodiment of the present invention, the method can also be used when migrating a VM 152, 156 from the first server 150 to the second server 160. After migration of the VM 152, 156 (with the vTPM 655 of the migrated VM 152, 156) a hypervisor 645 running on the second server 160 extends PCR_8 565 with system values from the second server 160.

In a preferred embodiment, the hypervisor 645 acts as a store component to cryptographically store configuration data associated with the trusted host environment in at least one cryptographic data structure. In an alternative embodiment, the store component comprises another component external to the VM 152, which communicates with the VM 152 to store configuration data within the PCRs 555 of the vTPM 655 of the VM 152.

Aspects of the present invention are described with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, aspects of the present invention may be embodied as a system, method or computer program, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilised. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, Radio Frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

For the avoidance of doubt, the term "comprising", as used herein throughout the description and claims is not to be construed as meaning "consisting only of".

The invention claimed is:

1. A system for providing validation of the compliance of a trusted host environment with a requirement of a virtual machine (VM) fully brought up and running in the trusted host environment, the system comprising:
 processing hardware; and
 data storage including a computer memory coupled to the processing hardware, wherein the data storage includes:
  a store component in the computer memory that cryptographically stores, in at least one cryptographic data structure, configuration data generated by the VM during bring-up of the VM in the trusted host environment;
  a control component in the computer memory, wherein the control component includes:
   an analyze component in the computer memory that, following bring-up of the VM running in the trusted host environment and responsive to the control component receiving the at least one cryptographic data structure, analyzes the at least one cryptographic data structure to determine the configuration data, wherein the configuration data determined by the analyze component includes event details of bring-up of the VM and actual configuration register values;
   a replay component in the computer memory that simulates events utilizing the event details determined by the analyze component to establish simulated configuration register values;
   a compare component in the computer memory that, responsive to the analyze component determining the configuration data, compares the configuration data with the requirement, wherein the compare component compares the actual configuration register values with the simulated configuration register values, and wherein the control component signals that the host environment is not trusted responsive to the compare component determining that the actual configuration register values do not match the simulated configuration register values; and
   a verify component in the computer memory that, responsive to the compare component determining that the configuration data matches the requirement, allows verification of the VM fully brought up and running in the trusted host environment.

2. The system of claim 1, wherein the verify component, responsive to the compare component determining that the configuration data does not match the requirement, denies verification of the VM in the trusted host environment.

3. The system of claim 1, wherein the store component is a hypervisor.

4. The system of claim 1, wherein the store component is in communication with the VM.

5. The system of claim 1, wherein the at least one cryptographic data structure is at least one platform configuration register (PCR).

6. The system of claim 1, wherein the at least one cryptographic data structure is associated with a further trusted host environment of the VM.

7. The system of claim 1, wherein the trusted host environment comprises a Trusted Platform Module.

8. The system of claim 1, wherein the trusted host environment includes a first server and the control component includes a second server.

9. A computer program product for providing validation of the compliance of a trusted host environment with a requirement of a virtual machine (VM) fully brought up and running in the trusted host environment, the computer program product comprising:
 a computer-readable storage device; and
 program code stored within the computer-readable storage device, wherein the program code, when executed by a computer system, causes the computer system to perform:
  cryptographically storing, in at least one cryptographic data structure, configuration data generated by the VM during bring-up of the VM in the trusted host environment;
  following bring-up of the VM running in the trusted host environment and in response to receiving the at least one cryptographic data structure, analyzing the at least one cryptographic data structure to determine the configuration data, wherein the configuration data determined by the analyzing includes event details of bring-up of the VM and actual configuration register values;
  simulating events utilizing the event details determined by the analyzing to establish simulated configuration register values;
  comparing the actual configuration register values with the simulated configuration register values, and, responsive to determining that the actual configuration register values do not match the simulated configuration register values, signaling that the host environment is not trusted;
  in response to determining the configuration data, comparing the configuration data with the requirement; and
  in response to determining that the configuration data matches the requirement, allowing verification of the VM fully brought up and running in the trusted host environment.

10. The computer program product of claim 9, wherein the program code further causes the computer system to perform:
 in response to determining that the configuration data does not match the requirement, denying verification of the VM in the trusted host environment.

11. The computer program product of claim 9, wherein cryptographically storing configuration data associated with the trusted host environment in at least one cryptographic data structure comprises cryptographically storing configuration data associated with the trusted host environment in at least one platform configuration register (PCR).

12. The computer program product of claim 9, wherein the program code further causes the computer system to perform:
 associating the at least one cryptographic data structure with a further trusted host environment of the VM.

13. The computer program product of claim 9, wherein the trusted host environment comprises a Trusted Platform Module.

14. The computer program product of claim 9, wherein the trusted host environment includes a first server and the control component includes a second server.

15. The system of claim 2, wherein the verify component denying verification of the VM in the trusted host environment includes the verify component enforcing compliance with a service level agreement (SLA) covering the VM.

16. The system of claim 15, wherein the verify component enforcing compliance includes the verify component disabling a user account of the VM.

17. The system of claim 1, wherein the configuration data further includes at least one identification number of a hardware component of the processing hardware.

18. The system of claim 1, wherein the configuration data further includes a software patch level.

19. The system of claim 1, wherein the control program verifies its authorization to access the VM via cryptographic key exchange.

* * * * *